(12) United States Patent
Cook et al.

(10) Patent No.: US 7,716,104 B2
(45) Date of Patent: May 11, 2010

(54) SYSTEM AND METHOD FOR ANALYZING TAX AVOIDANCE

(75) Inventors: Nancy Cook, Fairfax, VA (US); Eric Cook, Fairfax, VA (US)

(73) Assignee: Chainbridge Software, Inc., Fairfax, VA (US)

(*) Notice: Subject to any disclaimer, the term of this patent is extended or adjusted under 35 U.S.C. 154(b) by 1296 days.

(21) Appl. No.: 11/073,238

(22) Filed: Mar. 4, 2005

(65) Prior Publication Data

US 2005/0228729 A1 Oct. 13, 2005

Related U.S. Application Data

(60) Provisional application No. 60/549,682, filed on Mar. 4, 2004.

(51) Int. Cl.
*G06Q 40/00* (2006.01)
(52) U.S. Cl. .................................. 705/36 T
(58) Field of Classification Search ............... 705/36 T
See application file for complete search history.

(56) References Cited

U.S. PATENT DOCUMENTS

| | | | |
|---|---|---|---|
| 6,611,809 B1* | 8/2003 | McCalden ............... | 705/7 |
| 7,028,005 B2* | 4/2006 | Messmer et al. ......... | 705/35 |
| 2002/0097282 A1* | 7/2002 | Maltseff ................. | 347/5 |
| 2002/0143673 A1* | 10/2002 | Hitchings et al. ....... | 705/30 |
| 2003/0018576 A1* | 1/2003 | Zuckerbrot et al. ...... | 705/38 |
| 2003/0036996 A1* | 2/2003 | Lazerson ................ | 705/38 |
| 2003/0144931 A1* | 7/2003 | Stokes et al. ........... | 705/31 |
| 2003/0195780 A1* | 10/2003 | Arora et al. ............ | 705/7 |
| 2004/0158473 A1* | 8/2004 | Contractor ............. | 705/1 |
| 2004/0267599 A1* | 12/2004 | Heires et al. ........... | 705/10 |
| 2005/0004832 A1* | 1/2005 | Ostergard et al. ....... | 705/11 |
| 2005/0071265 A1* | 3/2005 | Nishimaki ............. | 705/38 |
| 2005/0137934 A1* | 6/2005 | Handler et al. ......... | 705/14 |
| 2005/0192879 A1* | 9/2005 | Rabbat .................. | 705/35 |
| 2006/0036528 A1* | 2/2006 | Harnsberger ........... | 705/35 |

OTHER PUBLICATIONS (ITEP) Institute on Taxation and Economic Policy, Study Finds Resurgence in Corporate Tax Avoidance, Oct. 19, 2000, pp. 1-3.*

* cited by examiner

*Primary Examiner*—Jagdish N Patel
*Assistant Examiner*—Kevin Poe
(74) *Attorney, Agent, or Firm*—Mintz, Levin, Cohn, Ferris, Glovsky & Popeo P.C.

(57) ABSTRACT

A system and method are provided for analyzing tax avoidance of a taxpaying entity. A taxpaying entity's financial information may be analyzed and used to compute a set of one or more financial ratios based at least in part on the entity's return on assets, capital, sales, and/or operating expenses. Those ratios may be compared to corresponding ratios for related firms operating in a predefined industry to identify whether the taxpaying entity engages in tax avoidance. The level of the taxpaying entity's tax avoidance may be calculated from analysis of the taxpaying entities controlled transactions. An adjusted tax liability may be produced after re-distribution, re-apportioning, or re-allocation of income, deductions, credits, or allowances.

24 Claims, 4 Drawing Sheets

SYSTEM AND METHOD FOR ANALYZING TAX AVOIDANCE

CROSS-REFERENCE TO RELATED APPLICATION

This claims the benefit of U.S. Provisional Patent Application Ser. No. 60/549,682, filed Mar. 4, 2004, which is hereby incorporated by reference herein in its entirety.

FIELD OF THE INVENTION

This invention relates generally to a system and method for analyzing a taxpaying entity's financial information, and more particularly to the use of one or more financial ratios to determine the amount of tax avoidance committed by the taxpaying entity.

BACKGROUND OF THE INVENTION

State corporate income tax receipts have been shrinking over the last ten to fifteen years. Many corporations doing business in the U.S. are reducing their state taxes through a number of widely used tax evasion/avoidance schemes. These corporations may inappropriately reduce tax payments to states by maneuvering income, expenses, and assets solely for the purpose of cutting their taxes. These practices may be aided by major accounting firms and consultants who have developed successful strategies for assisting firms with "tax management," a euphemism for tax avoidance schemes.

A major component of tax management involves organizations engaging in favorable transactions with commonly controlled entities. A commonly controlled entity need not be an incorporated entity or affiliated entity, but may be any entity that is controlled, directly or indirectly, by the same interests. Transactions with commonly controlled entities (controlled transactions) may be structured so that the tax burden on one or more of the parties is less than it would have been had the transaction not taken place or if the transaction had taken place at arms-length, between independent parties.

A lessened tax burden may be the result of favorable distributions of income, deductions, tax credits, or allowances stemming from a controlled transaction. This and other tax avoidance practices are known as "transfer pricing." Transfer pricing is most commonly discussed on a federal scale for transactions that cross national borders. However, similar transactions between organizations in different states may alter the tax liability of one or more organizations in one or more states. These often complex transactions make it difficult for states to determine the tax liability of certain organizations.

When the Internal Revenue Service (IRS) believes that a U.S. subsidiary of a foreign company is not properly reporting its income in the U.S., an IRS economist's report adjusting the subsidiary's U.S. income may be issued to the taxpayer. The authority for this income adjustment is provided by U.S. Internal Revenue Code (IRC) Section 482. Regulations governing IRC Section 482 state, "The purpose of Internal Revenue Code Section 482 is to ensure that taxpayers clearly reflect income attributable to controlled transactions, and to prevent the avoidance of taxes with respect to such transactions." The IRS adjusts entities' tax liability by re-allocating income, deductions, credits, or allowances based on what the allocation would have been if parties to a controlled transaction were independently controlled parties engaging in an arms-length transaction. This re-allocation may allow the transaction itself to occur and any non-tax benefits to accrue, while preventing any tax-avoiding consequences arising therefrom.

States can and have used authority similar to IRC Section 482 to augment state corporate taxable income or to reverse corporate actions taken solely for the purpose of reducing payment of state taxes. However, simply because state governments possess this power, their ability to effectively wield it is not guaranteed. States are not normally equipped to go up against large corporations who employ numerous accountants, economists, and consultants in attempts to reduce their tax liability. States may find even more difficulty when going up against numerous large corporations on an individual basis. These and other problems exist.

In view of the foregoing, it would be desirable to provide systems and methods for analyzing tax avoidance.

SUMMARY OF THE INVENTION

Various aspects of the invention overcome many drawbacks associated with transfer pricing and tax avoidance. The invention is applicable to solving problems in the area by providing tax-collecting entities with transfer pricing analyses for individual taxpaying entities. As used herein, an individual taxpaying entity may include a company, a corporation, a partnership, a non-profit organization, or any other taxpaying entity. In an embodiment, an independent party, with expertise in the tax field, may scrutinize individual corporate taxpayers' tax liability and execute an accurate and detailed transfer pricing analysis more efficiently than tax collecting entities. Armed with these transfer pricing analyses, tax-collecting entities may collect tax revenue that has been inappropriately shifted or avoided. For example, a taxpaying entity may include a state subsidiary of a national corporation (e.g., a given retail establishment in a chain of establishments). The present invention may identify that the state taxes paid by the state subsidiary are lower than what would be expected given one or more financial ratios of the subsidiary and, therefore, that the subsidiary is likely to be engaging in tax avoidance schemes. A detailed analysis of the taxpayer's tax avoidance may be generated and tax collection in the amount owed to the state may be pursued.

An embodiment of the invention may be implemented through the use of a computer system or network wherein a tax-collecting entity receives transfer pricing/tax adjustment analysis from an independent party or monitoring entity. As described herein, the invention relates to providing transfer pricing analysis to states. However, providing such analysis to other entities is contemplated. This process may be used to provide to such entities information concerning corporations, various types of business associations, or other entities.

In an embodiment of the invention, a tax-collecting entity's aggregate tax information, including data concerning various corporations and taxpaying entities, may be searched for parties that engage in tax avoidance. This initial search may scan tax data for taxpaying entities that engage in controlled transactions. A controlled transaction may be any transaction that an organization conducts with a commonly controlled entity. A commonly controlled entity need not be an incorporated entity or affiliated entity, but may be any entity that is controlled, directly or indirectly, by the same interests.

The tax data of an individual taxpaying entity identified through an initial controlled transaction search may be isolated and subject to transfer pricing analysis. This transfer pricing analysis may identify whether the taxpaying entity actually engages in tax avoidance by way of tax-favorable controlled transactions. If tax-avoiding activity is identified, a tax adjustment may be performed for the taxpaying entity. Tax adjustments may involve the re-distribution, re-apportioning, or re-allocation of the taxpaying entity's income, deductions, credits, or allowances to more accurately reflect the taxpaying entity's tax liability had it not engaged in transfer pricing. Such adjustments may be based on the expected outcome of the organization's controlled transactions had they been arms-length transactions between independently controlled parties. Data resulting from these tax adjustments may be used in an effort to collect the estimated tax liability owed from an individual taxpaying entity.

In an embodiment, transfer pricing analysis may be based on a comparison of an individual taxpaying entity's profit levels to the profit levels of similarly situated independent organizations. As part of this transfer pricing analysis, information from a taxpaying entity's tax return may be used to compute a standard set of one or more financial ratios. Federal and/or state tax data may be used to calculate such financial ratios. These financial ratios may measure the relationships between profit and costs incurred (or resources employed) and may reflect the magnitude of returns that a taxpaying entity is reporting on its capital, assets, and/or sales. These financial ratios may include the rate of return on the capital employed, the ratio of operating profit to sales, the ratio of gross profit to operating expenses, or other profit level indicators.

Financial ratios for a taxpaying entity under scrutiny may then be compared to similar ratios for independent companies operating in the same industry. Ratios for independent companies operating in the same industry, or information used in calculating such ratios, may come from an independent source, such as the Standard and Poor's Compustat™ database for publicly traded companies. Comparison of these ratios may reveal that the taxpaying entity under scrutiny is earning a less than acceptable rate of return as compared to independent firms engaged in the same activity. The determination of whether a taxpaying entity is earning a less than acceptable rate of return may include ratios that indicate profit levels below the interquartile range of profit levels for independent firms engaged in similar activities.

An indication that a taxpaying entity is earning a less than acceptable rate of profit may suggest that the taxpaying entity engages in controlled transactions that produce tax liabilities lower than if the same transactions had been conducted at arms-length between independent parties. A taxpaying entity that has been identified as earning a less than acceptable rate of return may be flagged to have its controlled transactions or financial data investigated further and its tax liability adjusted.

Taxpaying entities flagged to receive tax adjustments may have their income adjusted after re-distribution, re-apportioning, or re-allocation of income, deductions, credits, or allowances. Such re-distribution, re-apportioning, or re-allocation may be based on the expected outcome of an organization's controlled transactions if such transactions had been conducted at arms length between independent parties. Tax adjustments may then be calculated from the resultant values.

In another embodiment of the invention, a tax-collecting entity may cooperate with a monitoring entity to identify revenue that may be collected from taxpayers engaging in tax avoidance. The monitoring entity may receive aggregate tax data from the tax-collecting entity, identify taxpaying entities that engage in controlled transactions, perform transfer pricing analysis on those taxpaying entities, and calculate tax adjustments for those taxpaying entities who engage in transfer pricing. The monitoring entity may perform this service upon specific request of the tax collecting entity or on a regular schedule (monthly, bimonthly, quarterly, yearly, etc.).

A monitoring entity or other independent party may generate an income adjustment report after transfer pricing analysis is performed. An income adjustment report may be requested by a tax-collecting entity after transfer pricing analysis or may be provided on the initiative of a monitoring entity. An income adjustment report may be used internally by a tax collecting entity and may include all of the information necessary to justify or support a tax adjustment for a particular taxpaying entity. The income adjustment report, and the information it contains, may be used in conjunction with attempts to collect tax-adjusted revenue.

In one embodiment of the invention, tax data received from a tax collecting entity may be processed for use in transfer pricing analysis or tax adjustment. Tax collecting entities may use many different formats on which to store their tax files. In order to make transfer pricing analysis more efficient, this data must be converted to a form that can easily be read by standardized transfer pricing and report generation software. Following format conversion, tax data may be subject to error detection and gap filling before being sent on to transfer pricing and report generation software. This process may differ for different tax collecting entities due to variations among data formats and data fields.

BRIEF DESCRIPTION OF THE DRAWINGS

For a better understanding of the present invention, reference is made to the following description, taken in conjunction with the accompanying drawings, in which like reference characters refer to like parts throughout, and in which.

DETAILED DESCRIPTION OF THE INVENTION

Figure 1:
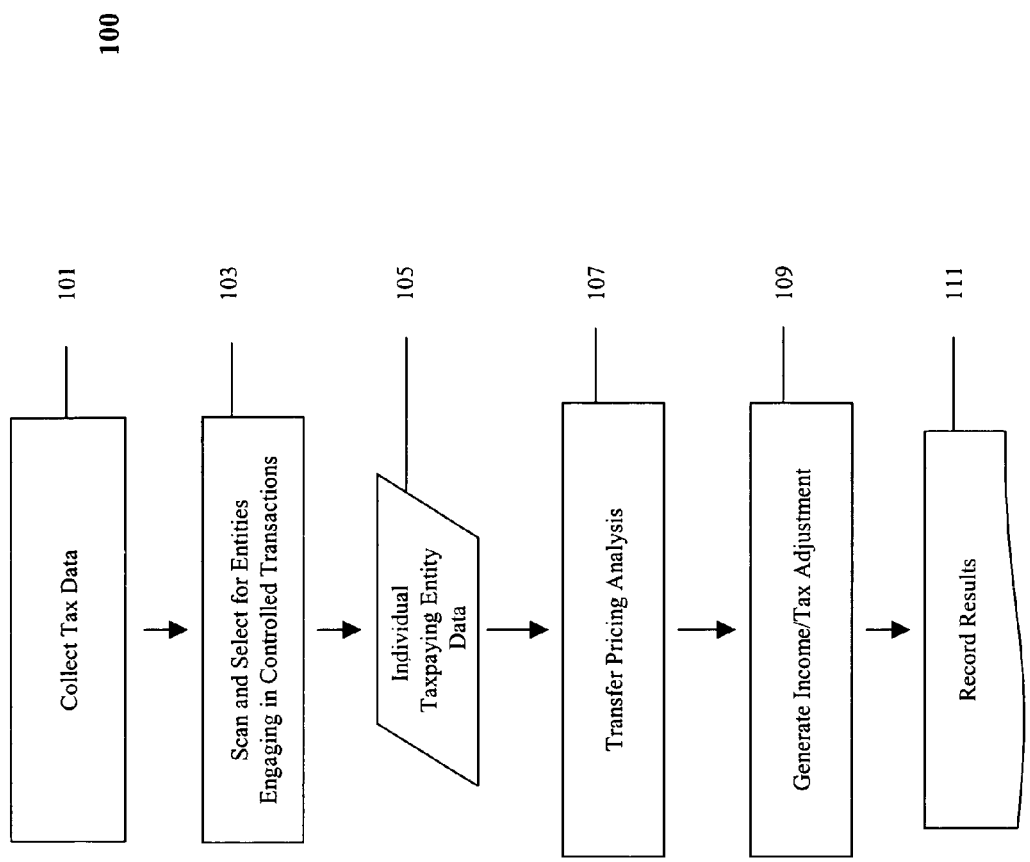
FIG. 1 illustrates a flowchart of an exemplary process for analyzing tax avoidance in accordance with the present invention.

FIG. 1 illustrates a process 100, in which state tax data is used to generate income adjustment amounts for certain taxpaying entities. An operation 101 may include the collection and storage of tax data received from a tax-collecting entity. In an operation 103, data from operation 101 may be searched to identify taxpaying entities who are candidates for tax adjustment. Tax adjustment may refer to any action that a tax collecting entity may take to re-distribute, re apportion, re-allocate, or otherwise adjust a taxpaying entity's income, deductions, credits, allowances, or other measure, for the purpose of more clearly reflecting a taxpaying entity's tax liability. The initial search of operation 103 may scan state tax data for indicators of tax avoidance, such as taxpaying entities that engage in controlled transactions. A controlled transaction may be any transaction that an organization conducts with a commonly controlled entity. A commonly controlled entity need not be an incorporated entity or affiliated entity, but may be any entity that is controlled, directly or indirectly, by the same interests. Operation 103 may also scan for other indicators of tax avoidance.

The tax data of an individual taxpaying entity identified through the initial search of operation 103 may be isolated in an operation 105. In an operation 107, a taxpaying entity's isolated tax data may be subject to transfer pricing analysis. The analysis of operation 107 may include scrutiny of the financial data and/or controlled transactions of a taxpaying entity. Operation 107 may uncover tax avoidance by a taxpaying entity that is under scrutiny by estimating the result of that entity's controlled transactions, had such transactions had been conducted by independent parties, at arms-length.

If tax avoidance is identified in operation 107, tax adjustment may be pursued for the taxpaying entity in an operation 109. Tax adjustments may include re-distribution, re-apportioning, or re-allocation of income, deductions, credits, or allowances. Such adjustments may be based on the predicted level of tax liability of a taxpaying entity if its controlled transactions had actually been arms-length transaction between independent parties. Such adjustments may also be based under the general principles recited in Internal Revenue Code section 482 (IRC 482) and associated regulations governing inter-company pricing for related party transactions. In an operation 111, tax adjustments or income adjustments may be recorded and stored for later use.

Figure 2:
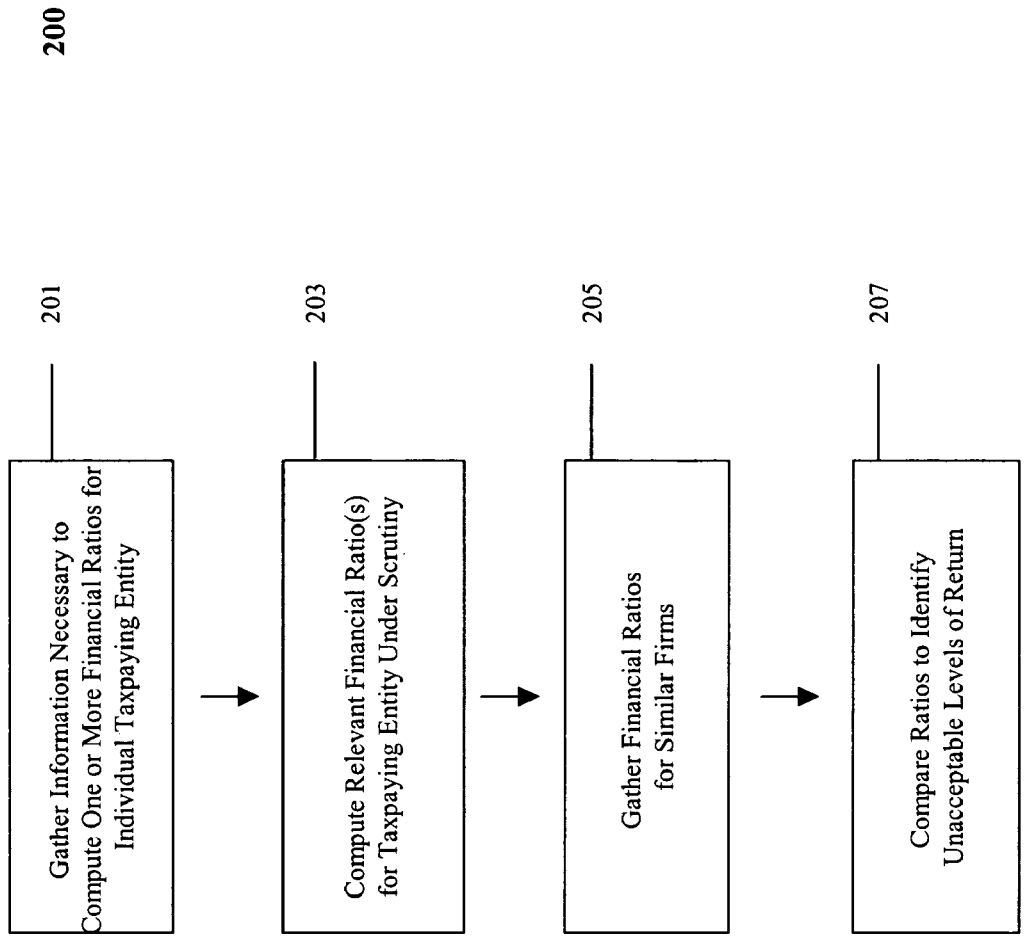
FIG. 2 illustrates a flowchart of an exemplary process of using one or more financial ratios in transfer pricing analysis in accordance with the present invention.

FIG. 2 illustrates an exemplary process 200, in which tax data of individual taxpaying entities may be subject to transfer pricing analysis. An operation 201 may include gathering the information necessary to compute a set of one or more financial ratios. This information may include state and federal tax data and/or other financial information regarding a taxpaying entity suspected of tax avoidance. This information may include tax data and/or other financial information for one or more tax years.

In an operation 203, a taxpaying entity's data may be used to compute the set of one or more financial ratios. These financial ratios may measure the relationships between profit and costs incurred (or resources employed) and may reflect the magnitude of returns that a taxpaying entity is reporting on its capital, assets, and/or sales. These financial ratios may include the rate of return on the capital employed, the ratio of operating profit to sales, the ratio of gross profit to operating expenses, and/or other profit level indicators.

In an operation 205, one or more financial ratios for independent companies operating in similar industries are gathered (e.g., the same set of one or more financial ratios computed in operation 203). Information for determining the ratios (or the ratios themselves) for companies operating in similar industries may come from an independent source, such as the Standard and Poor's Compustat™ database for publicly traded companies. These ratios may reflect the same type of calculations used to produce the standard set of financial ratios of operation 203. Operation 205 may include the sub-operation of determining which entities are operating in the same or similar industries as the entity in question. Preferably, ratios are gathered for entities in the most closely related industries such as, for example, industries classified by the same 4-digit SIC industry classification code as the entity in question. Information may be gathered for entities from other less-specific, related industries (e.g., 3-digit or 2-digit SIC codes) when, for example, less than a threshold number of entities (e.g., 8-10) are included in a more-specific, related classification.

In an operation 207, the one or more financial ratios for taxpaying entities under scrutiny may be compared to the ratios for companies operating in the same industry. If the comparison of these ratios indicates that a taxpaying entity is earning a less than acceptable rate of return as compared to independent firms engaged in the same activity (e.g., the taxpaying entity is engaging in suspiciously tax-favorable controlled transactions), the taxpaying entity may be flagged to receive a tax adjustment. The determination of whether a taxpaying entity is earning a less than acceptable rate of return may include the determining of ratios that indicate profit levels below the interquartile range of profit levels for independent firms engaged in similar activities.

Taxpaying entities flagged to receive tax adjustments may have their income adjusted after an investigation into the particulars of their controlled transactions. Specifically, a taxpaying entity may have its income, deductions, credits, or allowances re-distributed, re-apportioned, or re-allocated to reflect amounts that would exist had the entity's controlled transactions actually been arms-length transactions between independent parties. Income adjustments may also be based on a taxpaying entity's ratio value relative to the ratios of independent firms engaged in similar activities. Tax adjustments may then be calculated from adjusted income values.

In another embodiment, a tax-collecting entity may cooperate with a monitoring entity to identify revenue that may be collected from taxpaying entities engaging in tax avoidance. The monitoring entity may receive tax data from the tax-collecting entity, identify taxpaying entities that engage in controlled transactions, perform transfer pricing analysis on those taxpaying entities, calculate tax adjustments for those taxpaying entities engaging in tax avoidance, and report the results of this process to the tax-collecting entity. The monitoring entity may perform this service specifically upon request of the tax collecting entity or on a regular schedule (monthly, bi-monthly, quarterly, yearly, etc.).

In one embodiment, an income adjustment report may be generated after transfer pricing analysis is performed. An income adjustment report may be requested by a tax-collecting entity after the tax-collecting entity has received the results of a transfer pricing analysis. An income adjustment report may be used internally by the tax-collecting entity and may include all of the information necessary to justify or support a tax adjustment for a particular taxpaying entity. An income adjustment report may be used in conjunction with attempts to collect tax revenue from a taxpaying entity.

Figure 3:
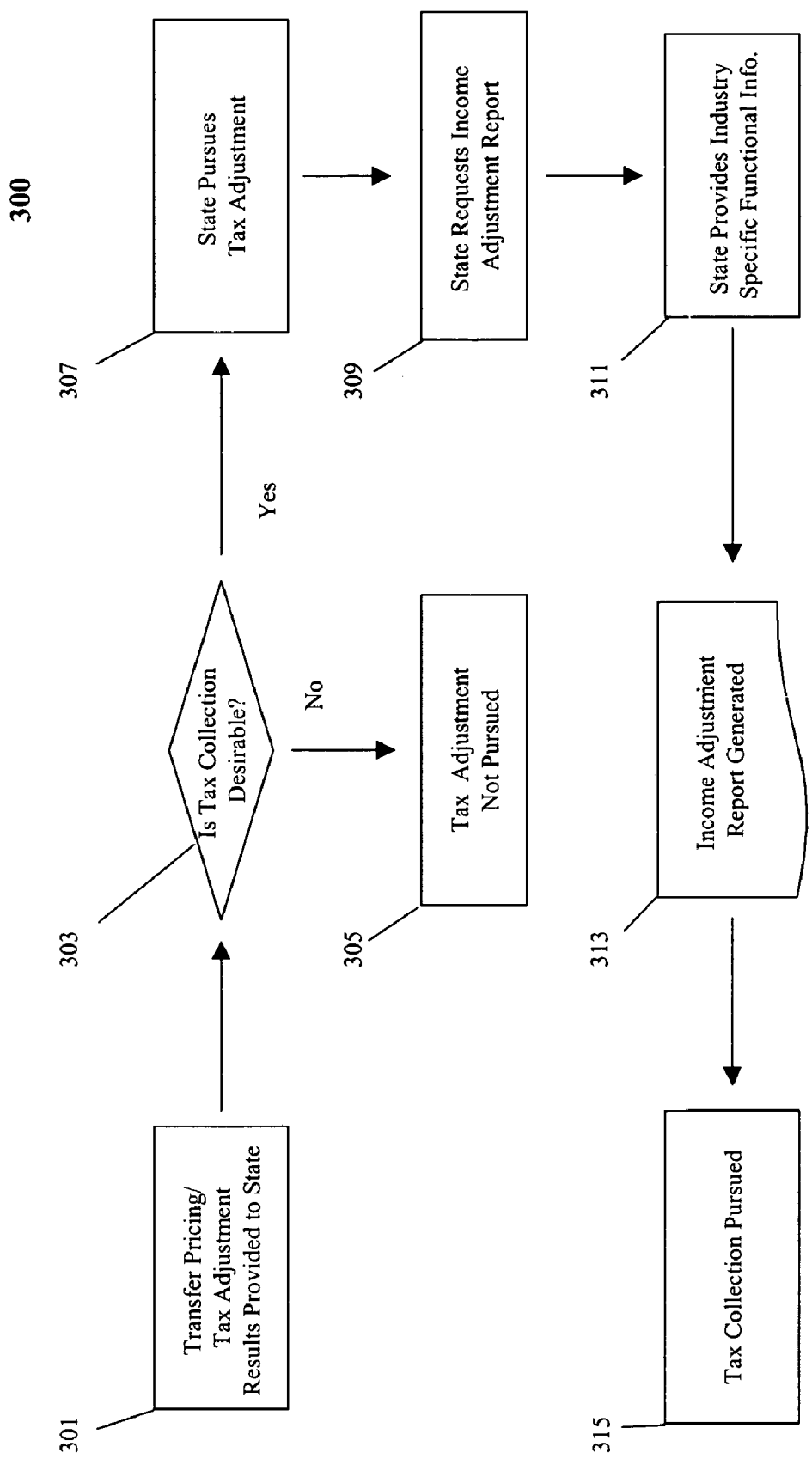
FIG. 3 illustrates an exemplary process in which income adjustment reports are generated for a state in accordance with the present invention.

FIG. 3 illustrates an exemplary process 300, in which an income adjustment report may be generated after transfer pricing analysis is performed. In an operation 301, the results of transfer pricing analysis or tax adjustment are provided to a state government or other tax collecting entity. An operation 303 indicates that a tax collecting entity may decide whether or not to pursue tax adjustment and collection for a particular taxpaying entity. The decision of operation 303 may be based on criteria indicating whether tax collection is desirable. An example of the type of information on which the decision of operation 303 may be based, is the magnitude of the estimated tax adjustment for a particular taxpaying entity. Very low tax adjustments may not be pursued because they may not be worth the effort, while very large tax adjustments may not be pursued because they may lead to great resistance and expensive litigation with a taxpaying entity. The decision in operation 303, or similar decisions, may take place at any point in the tax avoidance process and are not limited to decisions based on the magnitude of estimated tax adjustments.

If, in operation 303, a tax collecting entity decides not to pursue tax adjustment, it may enter an operation 305, wherein the process is halted. If the process is halted, information concerning a particular taxpaying entity may be stored for use at a later time. If, in operation 303, a tax collecting entity decides to pursue tax adjustment for a particular taxpaying entity, it may enter an operation 307.

Following operation 307 may be an operation 309, in which a tax collecting entity may request an income adjustment report from a monitoring entity. In an operation 311 the tax-collecting entity may submit certain functional information that is specific to the particular taxpaying entity and/or the taxpaying entity's industry. The information of operation 311 may be submitted to the monitoring entity along with a request for an income adjustment report, or may be submitted after such request. Industry specific functional information provided by the tax-collecting entity in operation 311 may include information concerning the economic substance of the particular controlled transactions that are under scrutiny and may be used in generating an income adjustment report. Information concerning the economic substance of controlled transactions may also be provided for use in transfer pricing analysis or for use in any embodiment of the invention. Some of the functional information provided in operation 311 may originate from the taxpaying entity itself.

A monitoring entity may provide a tax collecting entity with industry specific functional analysis checklists that specify the information needed when requests for income adjustment reports are made. These functional analysis checklists may vary from taxpaying entity to taxpaying entity, or from industry to industry. The functional analysis checklists may aid tax-collecting entities in providing functional information to the monitoring entity and may increase the efficiency of income adjustment report generation.

Once a monitoring entity receives a request for an income adjustment report along with or followed by industry specific functional information, the monitoring entity may draft an income adjustment report and provide it to the state in an operation 313. Tax collection may then be pursued by the tax collecting entity in an operation 315.

In one embodiment, tax data received from a state government may be processed for use in transfer pricing analysis or tax adjustment. Tax data may be received from the state as digital data from a mainframe or mini-computer system. It may also be contained on data tapes, cartridges, paper, or other format. Tax data may then be converted into a format and placed on a medium that can be read and used by transfer price testing and report-generating software (for example, one that may be used on personal computers). The procedures used to convert tax data may vary from state to state depending on the format on which individual states record and store their tax data.

After the data conversion process has been completed, the data may be subject to an error detection and correction process. This process may scan for keypunch and typographical errors within the fields required by transfer price testing and report-generating software. If errors are found in the required data fields, they may either be corrected according to available data or flagged as requiring additional information. This process may vary depending on the jurisdiction for which the process is being performed, as the required data fields may vary from jurisdiction to jurisdiction.

If data required by transfer price testing or report generating software is missing or flagged as requiring additional information, the missing data may be imputed or inferred. If imputation of data is required, it may be noted and reported to the jurisdiction.

After errors are corrected and missing data fields are filled, the data may be written to a standard layout required by transfer price testing and report-generating software. The process for generating standard formatting may vary depending on the jurisdiction for which the data is performed, as the data provided by states may vary.

Figure 4:
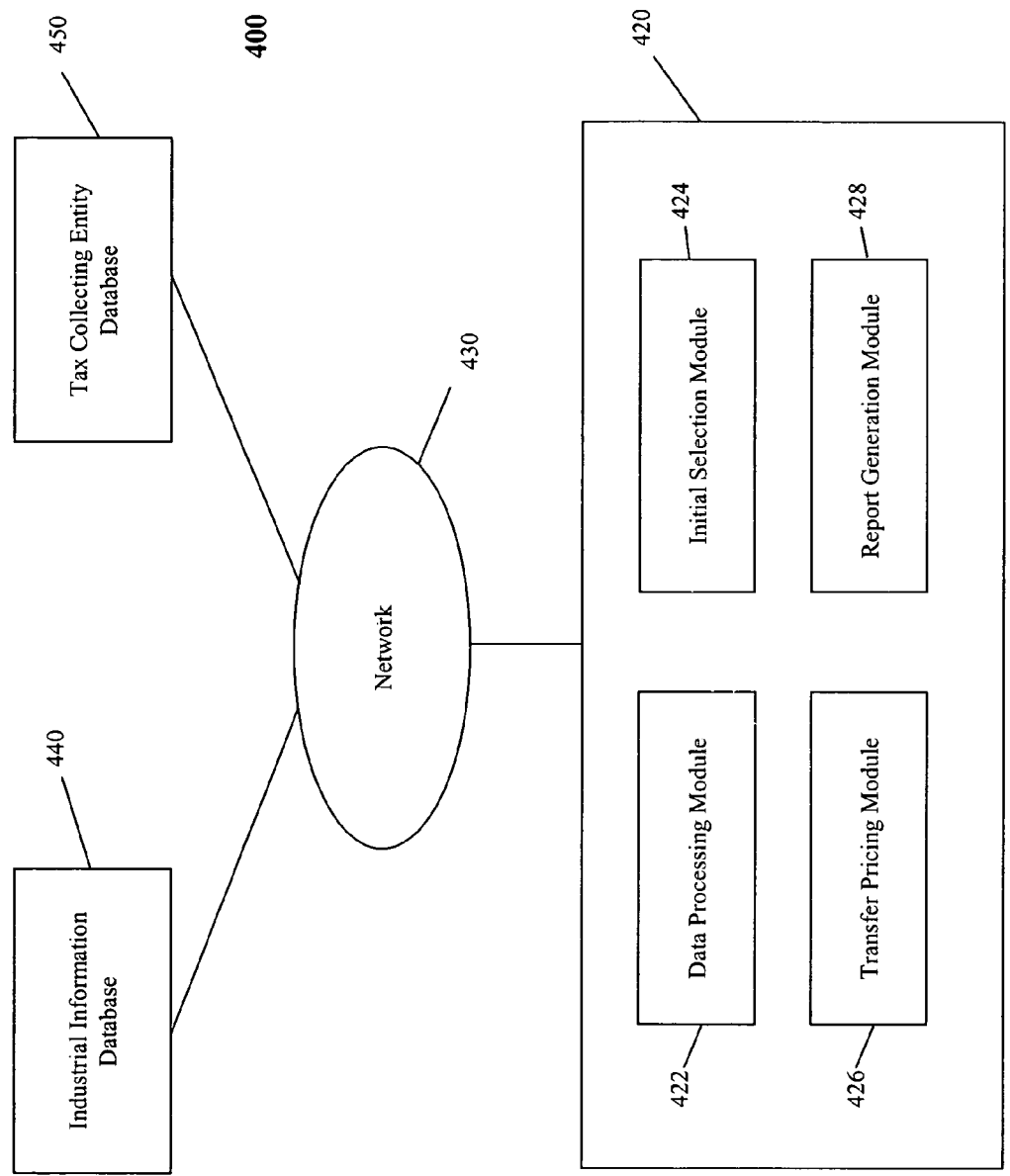
FIG. 4 illustrates an exemplary computer implemented system for analyzing tax avoidance in accordance with the present invention.

FIG. 4 illustrates an example of a system 400, according to one embodiment of the invention. System 400 may comprise a computer-implemented system capable of carrying out tax avoidance analysis and income adjustment report generation. System 400 may include a monitoring entity system 420, a network 430, one or more industrial information databases 440 or other data sources, and one or more tax-collecting entity databases 450 or other data sources.

In system 400, information from a state government or other tax collecting entity may be stored in tax-collecting entity database 450 or other data source. The information stored in tax collecting entity database 450 or other data source may include relevant tax data from one or more tax years for one or more taxpaying entities.

Information residing on tax collecting entity database 450 may be transmitted to monitoring entity system 420 via network 430. Network 430 may include the Internet, a private computer network, a wireless network, or other computer-to-computer information transmittal system. Information residing on tax collecting entity database 450 or other data source may also be transmitted to monitoring entity system 420 by floppy disk, data tapes, physical data entry, or other method of transmittal. Monitoring entity system 420 may include one or more personal computers, one or more servers, a network of computers, or other computer implemented system capable of carrying out tax avoidance analysis and report generation.

Tax information residing on monitoring entity system 420 may then be processed by a data processing module 422. Data processing module 422 may include software necessary to perform pre-processing for tax data. Data processing module 422 may manipulate tax data so that it may be compatible with any of the remaining processes or actions performed by monitoring entity system 420. Data processing module 422 may convert data received from tax collecting entity database 450 or industrial information database 440 to a format suitable for use with other modules within monitoring entity system 420. Data processing module 422 may search data from tax collecting entity database 450 or industrial information database 440 for errors or missing information. Data processing module 422 may correct errors or fill gaps as necessary. Data processing module 422 may make notation wherever errors are found and corrected and/or gaps are found and filled.

Tax data residing on monitoring entity system 420 may be passed through an initial selection module 424. Initial selection module 424 may scan aggregate tax data for certain qualities indicating whether taxpaying entities practice tax avoidance or transfer pricing. Qualities indicating whether a taxpaying entity practices tax avoidance or transfer pricing may include whether a taxpaying entity engages in controlled transactions.

A transfer pricing module 426 may be used to perform transfer pricing analysis on the tax data of individual taxpaying entities. Transfer pricing analysis may include any scrutiny of an individual taxpaying entity's financial information that would indicate whether, and to what extent, the taxpaying entity has engaged in transfer pricing or tax avoidance. Transfer pricing module 426 may also calculate adjusted income, deduction, credit, or allowance amounts and tax adjustments for an individual taxpaying entity.

Information residing on one or more industrial information databases 440 or other data sources may be transmitted to monitoring entity system 420 via network 430. Information residing on an industrial information database 440 may also be transmitted to a monitoring entity system by floppy disk, data tapes, physical data entry, or other method of transmittal. Information transmitted from an industrial information database 440 may be used by transfer pricing module 426 to conduct transfer pricing analysis. Information from an industrial information database 440 may include data necessary to calculate standard sets of financial ratios for independent firms engaged in activities similar to individual taxpaying entities whose data is under transfer pricing scrutiny. The information from industrial information database 440 may also include pre-calculated financial ratios.

Transfer pricing module 426 may compare a standard set of one or more financial ratios for an individual taxpaying entity to the financial ratios of similar entities. This comparison may be performed for the purpose of identifying whether, and to what extent, the individual taxpaying entity is engaging in tax avoidance.

A report generation module 428 may be used to generate income adjustment reports or other reports regarding taxpaying entities whose tax data has undergone transfer pricing analysis. Data from transfer pricing analysis of an individual taxpaying entity may be used by report generation module 428 to generate an income adjustment report.

Each of modules 422, 424, 426, and 428 may include any suitable hardware, software, or combination thereof for performing their respective functions. For example, a single component of hardware, software, or combination thereof may be provided that performs the functions of modules 422, 424, 426, and 428. In the embodiment of FIG. 4, the modules are shown as being implemented by monitoring entity system 420. In other embodiments, the modules may be performed at separate facilities or in a distributed arrangement. For example, functions of module 422 may be at least partially performed by the tax collecting entity, whereas functions of modules 424, 426, and 428 may be performed by monitoring entity system 420. In one embodiment, a computer readable medium (e.g., a compact disc (CD) or other suitable memory) may be encoded with computer executable instructions for performing some or all of the functions of modules 422, 424, 426, and 428. Such a computer readable medium may be offered for sale to, for example, administrators of monitoring entity system(s) 420 or to tax collecting entities themselves.

Thus it is seen that methods and systems are provided for analyzing tax avoidance. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for identifying entities that have avoided a state corporate income tax, the method comprising:
   performing with a computer:
      searching state corporate income tax data for a plurality of entities for an indicator that one or more of the entities is engaging in controlled transactions;
      identifying, as a result of the searching, at least one entity that is likely to have engaged in controlled transactions; and
      performing a transfer pricing analysis with respect to the at least one entity, wherein the transfer pricing analysis comprises:
         determining, from state corporate income tax data for the at least one entity, a ratio of operating profit to sales for the at least one entity;
         determining an industry for the at least one entity;
         determining ratios of operating profit to sales for a plurality of other entities in the industry;
         comparing the ratio of operating profit to sales for the at least one entity to the ratios of operating profit to sales for the other entities in the industry; and
         determining, as a result of the comparing, that the at least one entity is likely to have avoided a state corporate income tax.

2. The method of claim 1, wherein the state corporate income tax data comprises aggregate state corporate income tax data of a state tax collecting entity and wherein the method further comprises receiving the state corporate income tax data from the state tax collecting entity.

3. The method of claim 2, further comprising pre-processing the state corporate income tax data prior to said searching.

4. The method of claim 1, wherein said determining ratios of operating profit to sales for a plurality of other entities in the industry comprises determining said ratios from commercially-available data for the plurality of other entities in the industry and the method further comprises receiving the commercially-available data from a commercial database.

5. The method of claim 4, wherein said receiving the commercially-available data comprises receiving data from Standard & Poor's Compustat database.

6. The method of clam 1, further comprising generating a report indicating a state tax adjustment for the at least one entity.

7. The method of claim 1, wherein said searching state corporate income tax data for a plurality of entities for an indicator that one or more of the entities is engaging in controlled transactions comprises searching the state corporate income tax data for an indicator of apportioning of the plurality of entities.

8. The method of claim 1, wherein said identifying comprises identifying, as a result of the searching, a plurality of entities that are likely to have engaged in controlled transactions and the method further comprises performing said transfer pricing analysis with respect to each of said plurality of entities that are likely to have engaged in controlled transactions.

9. The method of claim 8, further comprising determining a state corporate income tax adjustment for each of said plurality of entities that are likely to have engaged in controlled transactions and generating a report indicative of the state corporate income tax adjustments.

10. The method of claim 1, wherein said determining that the at least one entity is likely to have avoided a state corporate income tax comprises identifying that the ratio of operating profit to sales for the at least one entity ranks below an interquartile range of the ratios of operating profit to sales for the other entities in the industry.

11. A system for identifying entities that have avoided a state corporate income tax, the system comprising:
   a computer configured to:
      search state corporate income tax data for a plurality of entities for an indicator that one or more of the entities is engaging in controlled transactions;
      identify, as a result of the search, at least one entity that is likely to have engaged in controlled transactions; and
      perform a transfer pricing analysis with respect to the at least one entity, wherein the transfer pricing analysis comprises:
         determining, from state corporate income tax data for the at least one entity, a ratio of operating profit to sales for the at least one entity;
         determining an industry for the at least one entity;
         determining ratios of operating profit to sales for a plurality of other entities in the industry;

comparing the ratio of operating profit to sales for the at least one entity to the ratios of operating profit to sales for the other entities in the industry; and determining, as a result of the comparing, that the at least one entity is likely to have avoided a state corporate income tax.

12. The system of claim 11, wherein the state corporate income tax data comprises aggregate state corporate income tax data of a state tax collecting entity and wherein the computer-implemented module is further configured to receive the state corporate income tax data from the state tax collecting entity.

13. The system of claim 12, wherein the computer-implemented module is further configured to pre-process the state corporate income tax data prior to said searching.

14. The system of claim 11, wherein the computer-implemented module is configured to determine the ratios of operating profit to sales for the plurality of other entities in the industry from commercially-available data for the plurality of other entities in the industry and the computer-implemented module is further configured to receive the commercially-available data from a commercial database.

15. The system of claim 14, wherein the commercial database comprises Standard & Poor's Compustat database.

16. The system of clam 11, wherein the computer-implemented module is further configured to generate a report indicating a state corporate income tax adjustment for the at least one entity.

17. The system of claim 11, wherein the computer-implemented module is configured to search the state corporate income tax data for an indicator of apportioning of the plurality of entities.

18. The system of claim 11, wherein the computer-implemented module is configured to identify, as a result of the search, a plurality of entities that are likely to have engaged in controlled transactions and is further configured to perform the transfer pricing analysis with respect to each of the plurality of entities that are likely to have engaged in controlled transactions.

19. The system of claim 18, wherein the computer-implemented module is configured to determine a state tax adjustment for each of the plurality of entities that are likely to have engaged in controlled transactions and generate a report indicative of the state corporate income tax adjustments.

20. The system of claim 11, wherein the computer-implemented module is configured to identify that the ratio of operating profit to sales for the at least one entity ranks below the interquartile range of the ratios of operating profit to sales for the other entities in the industry, thereby determining that the at least one entity is likely to have avoided a state tax.

21. Computer readable storage medium encoded with computer executable instructions for causing a computer to perform the method comprising:

searching state corporate income tax data for a plurality of entities for an indicator that one or more of the entities is engaging in controlled transactions;

identifying, as a result of the searching, at least one entity that is likely to have engaged in controlled transactions; and performing a transfer pricing analysis with respect to the at least one entity, wherein the transfer pricing analysis comprises:

determining, from state corporate income tax data for the at least one entity, a ratio of operating profit to sales for the at least one entity;

determining an industry for the at least one entity;

determining ratios of operating profit to sales for a plurality of other entities in the industry;

comparing the ratio of operating profit to sales for the at least one entity to the ratios of operating profit to sales for the other entities in the industry; and determining, as a result of the comparing, that the at least one entity is likely to have avoided a state corporate income tax.

22. The computer readable storage medium of claim 21, further encoded with computer executable instructions for causing the computer to pre-process the state corporate income tax data prior to said searching.

23. The computer readable storage medium of claim 21, further encoded with computer executable instructions for causing the computer to generate a report indicating a state corporate income tax adjustment for the at least one entity.

24. The computer readable storage medium of claim 21, further encoded with computer executable instructions for causing the computer to identify, as a result of the search, a plurality of entities that are likely to have engaged in controlled transactions and to perform the transfer pricing analysis with respect to each of the plurality of entities that are likely to have engaged in controlled transactions.

* * * * *